US009112875B2

(12) United States Patent
Zaid et al.

(10) Patent No.: US 9,112,875 B2
(45) Date of Patent: Aug. 18, 2015

(54) SYSTEM AND METHOD FOR ANONYMOUS ADDRESSING OF CONTENT ON NETWORK PEERS AND FOR PRIVATE PEER-TO-PEER FILE SHARING

(75) Inventors: Sam Zaid, Ottawa (CA); Gary Linscott, Kirkland, WA (US); Adam Becevello, Ottawa (CA); Tariq Zaid, Ottawa (CA); Paul Lem, Ottawa (CA)

(73) Assignee: Sam Zaid, Ottawa, ON (CA)

( * ) Notice: Subject to any disclaimer, the term of this patent is extended or adjusted under 35 U.S.C. 154(b) by 733 days.

(21) Appl. No.: 12/535,549

(22) Filed: Aug. 4, 2009

(65) Prior Publication Data

US 2011/0035503 A1    Feb. 10, 2011

(51) Int. Cl.
*H04L 29/08* (2006.01)
*H04L 29/06* (2006.01)
*G06F 15/16* (2006.01)

(52) U.S. Cl.
CPC .......... *H04L 67/104* (2013.01); *H04L 63/0407* (2013.01); *H04L 63/0442* (2013.01); *H04L 67/1063* (2013.01); *H04L 63/0421* (2013.01)

(58) Field of Classification Search
CPC ........................ H04L 67/104; H04L 63/0421
See application file for complete search history.

(56) References Cited

U.S. PATENT DOCUMENTS

| 2007/0130070 A1* | 6/2007 | Williams | 705/50 |
|---|---|---|---|
| 2009/0037211 A1* | 2/2009 | McGill et al. | 705/1 |
| 2010/0169964 A1* | 7/2010 | Liu et al. | 726/12 |
| 2010/0241711 A1* | 9/2010 | Ansari et al. | 709/205 |
| 2011/0270924 A1* | 11/2011 | Johnsson et al. | 709/204 |

\* cited by examiner

*Primary Examiner* — Suraj Joshi

(57) ABSTRACT

A system and method for efficient and private peer-to-peer file sharing consists of ascribing a uniquely identified and anonymous link (an "edgelink") to any file or set of files on a peer computer. The link is registered with a publishing server along with continuously updated connectivity information about the peer without registering any identifying information about the file. A peer recipient is able to access the link, receive connectivity information about the publishing peer from the server, and then receive the file from the publishing peer without file content passing through the server, mediating any intermediary NAT devices without requiring any manual or automatic device reconfiguration.

20 Claims, 2 Drawing Sheets

SYSTEM AND METHOD FOR ANONYMOUS ADDRESSING OF CONTENT ON NETWORK PEERS AND FOR PRIVATE PEER-TO-PEER FILE SHARING

FIELD OF THE INVENTION

This invention pertains to the field of electrical computers and digital processing systems and in particular file sharing systems and specifically a system and a method for anonymous addressing of content stored on computers at the edge of the network. This is coupled with a system and method for the private peer-to-peer exchange of anonymously addressed content.

BACKGROUND OF THE INVENTION

Network Architecture
Client-Server

Client-server is a computing architecture which separates a client from a server, and is almost always implemented over a computer network. Each client or server connected to a network can also be referred to as a node. The most basic type of client-server architecture employs only two types of nodes: clients and servers. This type of architecture is sometimes referred to as two-tier. It allows devices to share files and resources.

Each instance of the client software can send data requests to one or more connected servers. In turn, the servers can accept these requests, process them, and return the requested information to the client.

Peer-to-Peer

A peer-to-peer (P2P) computer network exploits diverse connectivity between participants in a network and the cumulative bandwidth of network participants rather than conventional centralized resources where a relatively low number of servers provide the core value to a service or application. Peer-to-peer networks are typically used for connecting nodes via largely ad hoc connections.

A pure peer-to-peer network does not have the notion of clients or servers, but only equal peer nodes that simultaneously function as both "clients" and "servers" to the other nodes on the network. This model of network arrangement differs from the client-server model where communication is usually to and from a central server. A typical example for a non peer-to-peer file transfer is an FTP server where the client and server programs are quite distinct, and the clients initiate the download/uploads and the servers react to and satisfy these requests.

P2P File Transfer
First P2P-Generation: Server-Client

The first generation of peer-to-peer file sharing networks had a centralized file list. In the centralized peer-to-peer model, a user would send a search to the centralized server of what they were looking for. The server then sends back a list of peers that have the data and facilitates the connection and download.

The first file-sharing programs marked themselves by inquiries to a server, either the data to the download held ready or in appropriate different Peers and so-called Nodes further-obtained, so that one could download there. Two examples were Napster (today using a pay system) and eDonkey2000 in the server version.

Second P2P-Generation: Decentralization

Justin Frankel of Nullsoft set out to create a network without a central index server, and Gnutella was the result. Unfortunately, the Gnutella model of all nodes being equal quickly died from bottlenecks as the network grew from incoming Napster refugees. FastTrack solved this problem by having some nodes be 'more equal than others'.

By electing some higher-capacity nodes to be indexing nodes, with lower capacity nodes branching off from them, FastTrack allowed for a network that could scale to a much larger size.

Gnutella quickly adopted this model, and most current peer-to-peer networks implement this design, as it allows for large and efficient networks without central servers.

Also included in the second generation are distributed hash tables (DHTs), which help solve the scalability problem by electing various nodes to index certain hashes (which are used to identify files), allowing for fast and efficient searching for any instances of a file on the network. This is not without drawbacks; perhaps most significantly, DHTs do not directly support keyword searching (as opposed to exact-match searching).

The best examples are Gnutella, Kazaa or eMule with Kademlia, whereby Kazaa has still a central server for logging in.

Third P2P-Generation: Indirect and Encrypted

The third generation of peer-to-peer networks has anonymity features built in. Examples of anonymous networks are ANts P2P, RShare, Freenet, I2P, GNUnet and Entropy.

A degree of anonymity is realized by routing traffic through other users' clients, which have the function of network nodes. This makes it harder for someone to identify who is downloading or who is offering files. Most of these programs also have strong encryption to resist traffic sniffing.

Friend-to-friend networks only allow already-known users (also known as "friends") to connect to the user's computer then each node can forward requests and files anonymously between its own "friends" nodes.

Third-generation networks have not reached mass usage for file sharing because most current implementations incur too much overhead in their anonymity features, making them slow or hard to use.

BitTorrent

BitTorrent is a peer-to-peer file sharing (P2P) communications protocol. BitTorrent is a method of distributing large amounts of data widely without the original distributor incurring the entire costs of hardware, hosting and bandwidth resources. Instead, when data is distributed using the BitTorrent protocol, each recipient supplies pieces of the data to newer recipients, reducing the cost and burden on any given individual source, providing redundancy against system problems, and reducing dependence on the original distributor.

A BitTorrent client is any program that implements the BitTorrent protocol. Each client is capable of preparing, requesting, and transmitting any type of computer file over a network, using the protocol. A peer is any computer running an instance of a client.

To share a file or group of files, a peer first creates a "torrent." This small file contains metadata about the files to be shared and about the tracker, the computer that coordinates the file distribution. Peers that want to download the file first obtain a torrent file for it, and connect to the specified tracker, which tells them from which other peers to download the pieces of the file.

Though both ultimately transfer files over a network, a BitTorrent download differs from a classic full-file HTTP request in several fundamental ways:

First, BitTorrent makes many small P2P requests over different TCP sockets, while web-browsers typically make a single HTTP GET request over a single TCP socket. Second, BitTorrent downloads in a random or in a "rarest-first" approach that ensures high availability, while HTTP downloads in a sequential manner.

Taken together, these differences allow BitTorrent to achieve much lower cost, much higher redundancy, and much greater resistance to abuse or to "flash crowds" than a regular HTTP server. However, this protection comes at a cost: downloads can take time to rise to full speed because it may take time for enough peer connections to be established, and it takes time for a node to receive sufficient data to become an effective uploader. As such, a typical BitTorrent download will gradually rise to very high speeds, and then slowly fall back down toward the end of the download. This contrasts with an HTTP server that, while more vulnerable to overload and abuse, rises to full speed very quickly and maintains this speed throughout.

File Transfer Protocols
File Transfer Protocol (FTP)

FTP is used to transfer data from one computer to another over the Internet, or through a network. Specifically, FTP is a commonly used protocol for exchanging files over any network that supports the TCP/IP protocol (such as the Internet or an intranet). There are two computers involved in an FTP transfer: a server and a client. The FTP server, running FTP server software, listens on the network for connection requests from other computers. The client computer, running FTP client software, initiates a connection to the server. Once connected, the client can do a number of file manipulation operations such as uploading files to the server, download files from the server, rename or delete files on the server and so on.

User Datagram Protocol (UDP)

UDP is one of the core protocols of the Internet protocol suite. Using UDP, programs on networked computers can send short messages sometimes known as datagrams (using Datagram Sockets) to one another. UDP is sometimes called the Universal Datagram Protocol.

UDP does not guarantee reliability or ordering in the way that TCP does. Datagrams may arrive out of order, appear duplicated, or go missing without notice. Avoiding the overhead of checking whether every packet actually arrived makes UDP faster and more efficient, at least for applications that do not need guaranteed delivery.

Hypertext Transfer Protocol (HTTP)

HTTP is a communications protocol used to transfer or convey information on intranets and the World Wide Web. HTTP is a request/response protocol between a client and a server. The client making an HTTP request—such as a web browser, spider, or other end-user tool—is referred to as the user agent. The responding server—which stores or creates resources such as HTML files and images—is called the origin server. In between the user agent and origin server may be several intermediaries, such as proxies, gateways, and tunnels. HTTP is not constrained to using TCP/IP and its supporting layers, although this is its most popular application on the Internet.

Typically, an HTTP client initiates a request by establishing a Transmission Control Protocol (TCP) connection to a particular port on a host. An HTTP server listening on that port waits for the client to send a request message.

Upon receiving the request, the server sends back a status line, such as "HTTP/1.1 200 OK", and a message of its own, the body of which is perhaps the requested file, an error message, or some other information.

Resources to be accessed by HTTP are identified using Uniform Resource Identifiers (URIs) (or, more specifically, Uniform Resource Locators (URLs)) using the http: or https URI schemes.

CURIE (a compact URI) is an abbreviated URI expressed in CURIE syntax, and may be found in both XML and non-XML grammars. An example CURIE is "[curl:EA83BZ99]" excluding the quotation marks.

Network Address Transversal (NAT)

NAT devices allow internal networks to communicate with external networks using a limited number of external IP Addresses by changing the source address of outgoing requests and listening for replies. This leaves the internal network ill-suited to act as a server, as the NAT device has no way of determining the internal host for which incoming packets are destined. On the Internet, this problem has not generally been relevant to home users behind NAT devices, as they either do not need to act as servers or can use static NAT mappings to correlate incoming requests to internal hosts. However, applications such as P2P file sharing (such as BitTorrent or Gnutella clients) or VoIP networks (such as Skype) require clients to act like servers, thereby posing a problem for users behind NAT devices, as incoming requests cannot be correlated to the proper internal host.

A possible solution to this problem is to use NAT traversal techniques using protocols such as STUN (Simple Traversal of UDP) or ICE (Interactive Connectivity Establishment) or proprietary approaches in a session border controller. NAT traversal is possible in both TCP- and UDP-based applications, but the UDP-based technique is simpler, more widely understood, and more compatible with legacy NATs. In either case, the high level protocol must be designed with NAT traversal in mind, and it does not work reliably across symmetric NATs or other poorly-behaved legacy NATs.

Instant Messaging

Instant messaging (IM) is a form of real-time communication between two or more people based on typed text. The text is conveyed via computers connected over a network such as the Internet. Files may also be transferred to users via an IM client.

IM is built around the concept of real-time, synchronous messaging. For example, I send a message intended for you right now.

Social Graph

A Social Network or Social Graph (e.g. Facebook) is a social structure made of nodes (which are generally individuals or organizations) that are tied by one or more specific types of interdependency, such as values, visions, idea, financial exchange, friends, kinship, dislike, conflict, trade, web links, sexual relations, disease transmission (epidemiology), or airline routes.

Really Simple Syndication (RSS)

RSS is a family of Web feed formats used to publish frequently updated content such as blog entries, news headlines or podcasts. An RSS document, which is called a "feed", "web feed", or "channel", contains either a summary of content from an associated web site or the full text. RSS makes it possible for people to keep up with their favorite web sites in an automated manner that's easier than checking them manually.

Media RSS (MRSS) is an RSS module used for syndicating multimedia files (audio, video, and image) in RSS feeds. It was designed in 2004 by Yahoo! and the Media RSS community, and adds several enhancements to RSS enclosures.

Presence

In computer and telecommunications networks, presence information is a status indicator that conveys ability and willingness of a potential communication partner—for example a user to communicate. A user's client provides presence information (presence state) via a network connection to a presence service, which is stored in what constitutes his personal availability record (called a presentity) and can be made available for distribution to other users (called watchers) to convey his availability for communication. Presence information has wide application in many communication services and is one of the innovations driving the popularity of instant messaging or recent implementations of voice over IP clients.

Universal Plug and Play

Universal Plug and Play (UPnP) is a set of computer network protocols promulgated by the UPnP Forum. The goals of UPnP are to allow devices to connect seamlessly and to simplify the implementation of networks in the home (data sharing, communications, and entertainment) and corporate environments. UPnP achieves this by defining and publishing UPnP device control protocols built upon open, Internet-based communication standards.

The term UPnP is derived from Plug-and-play, a technology for dynamically attaching devices to a computer directly. UPnP enables communication between any two devices under the command of any control device on the network (LAN).

The UPnP architecture supports zero-configuration, "invisible networking" and automatic discovery for many device categories from a range of vendors; any device can dynamically join a network, obtain an IP address, announce its name, convey its capabilities upon request, and learn about the presence and capabilities of other devices. DHCP and DNS servers are optional and are only used if they are available on the network. Devices can leave the network automatically without leaving any unwanted state information behind.

The foundation for UPnP networking is IP addressing. Each device must have a Dynamic Host Configuration Protocol (DHCP) client and search for a DHCP server when the device is first connected to the network. If no DHCP server is available, that is, the network is unmanaged; the device must assign itself an address. If during the DHCP transaction, the device obtains a domain name, for example, through a DNS server or via DNS forwarding, the device should use that name in subsequent network operations; otherwise, the device should use its IP address.

Broadcatching

Broadcatching is the downloading of digital content that has been made available over the Internet using RSS syndication.

The general idea is to use an automated mechanism to aggregate various web feeds and download content for viewing or presentation purposes.

There remains a need for efficient peer-to-peer file sharing.

SUMMARY OF THE INVENTION

The present invention provides for a system and method for efficient and private peer-to-peer file sharing. The system consists of means to ascribe a uniquely identified and anonymous link (an "edgelink") to any file or set of files on a peer computer; means for registering the link with a publishing server along with continuously updated connectivity information about the peer without registering any identifying information about the file; and, means for a peer recipient to access the link, receive connectivity information about the publishing peer from the server, and then receive the file from the publishing peer without file content passing through the server, mediating any intermediary NAT devices without requiring any manual or automatic device reconfiguration.

The invention further provides a system for creating private peer-to-peer file sharing networks comprising: means to integrate an external set of social graphs and build private groups of individuals through an assembly or invitation process; means to aggregate uniquely identified and anonymous links to files stored on peer nodes (computers belonging to individuals within the group) within the private group; means for a peer recipient to access the link and receive the file from the publishing peer without file content passing through the server, mediating any intermediary NAT devices without requiring any manual or automatic device reconfiguration.

In one embodiment of the invention, the system for peer-to-peer filing sharing further comprises a social network layer.

In another embodiment of the invention, the system for peer-to-peer file sharing further comprises means for security options that require peers to authenticate prior to the release of identifying connectivity information.

In yet another embodiment of the invention, the system for peer-to-peer file sharing further comprises a swarming protocol to allow wide-scale distribution of published content.

In still another embodiment of the invention, the system for peer-to-peer file sharing further comprises a link syndication capability for a peer to publish an automatically updated list of files that enables other users to subscribe to content feeds (streams) and get notified of changes and newly shared files.

In one embodiment of the invention, the system includes the means to index, search through, browse, and comment on published links.

In another embodiment of the invention, the system includes a policy engine to control access to published links.

In yet another embodiment of the invention, the system includes a buddy list that allows a user to maintain a contact list of friends, co-workers, and other contacts and to selectively send link to all or a specific subset of those contacts.

In one embodiment of the invention, the system provides a Public-key Cryptography Scheme for uniquely identifying peers and securing P2P transfers at all points between publishing a link, subscribing to a link, and transferring files.

In another embodiment of the invention, the system includes means to temporarily or permanently publish the content referenced by a link to a central server.

In one embodiment of the invention there is provided a system and method for peer-to-peer file sharing.

In one embodiment of the invention, there is provided a system for peer-to-peer file sharing comprising:

1. means to ascribe a uniquely identified and anonymous link (an "edgelink") to any file or set of files on a peer computer;
2. means for registering the link with a publishing server along with continuously updated connectivity information about the peer without registering any identifying information about the file;
3. means for a peer recipient to access the link, receive connectivity information about the publishing peer from the server, and then receive the file from the publishing peer without file content passing through the server, mediating any intermediary NAT devices without requiring any manual or automatic device reconfiguration;
4. means for keeping a history of changes to a published piece of content or file or set of files;
5. means for keeping an automatically versioned backup copy of files stored on a remote server;
6. means whereby one group where users invite other users for the purposes of collaborating and group editing published content published;

7. means for version tracking and offline sharing; and,
8. an automated backup system.

The system of the invention may include one or more of the following components:
1. a billing and transaction system for the sale of content to other users;
2. various central media publishing systems such as iTunes or Facebook;
3. a set of Application Programming Interfaces (APIs) and a Software Development Kit (SDK) allowing 3rd parties to develop applications that can link, store, and connect directly to content stored on a peer computer;
4. real-time transport and media handling controls to support streaming content directly from a peer computer;
5. provisions for mobile and embedded peers;
6. provisions for the addition of a compaction scheme for links that deviates from standard URL like conventions in order to shorten the overall character length of the link; and,
7. an obfuscation scheme to enhance content security and privacy.

DETAILED DESCRIPTION OF EXAMPLES OF THE INVENTION

Figure 1:
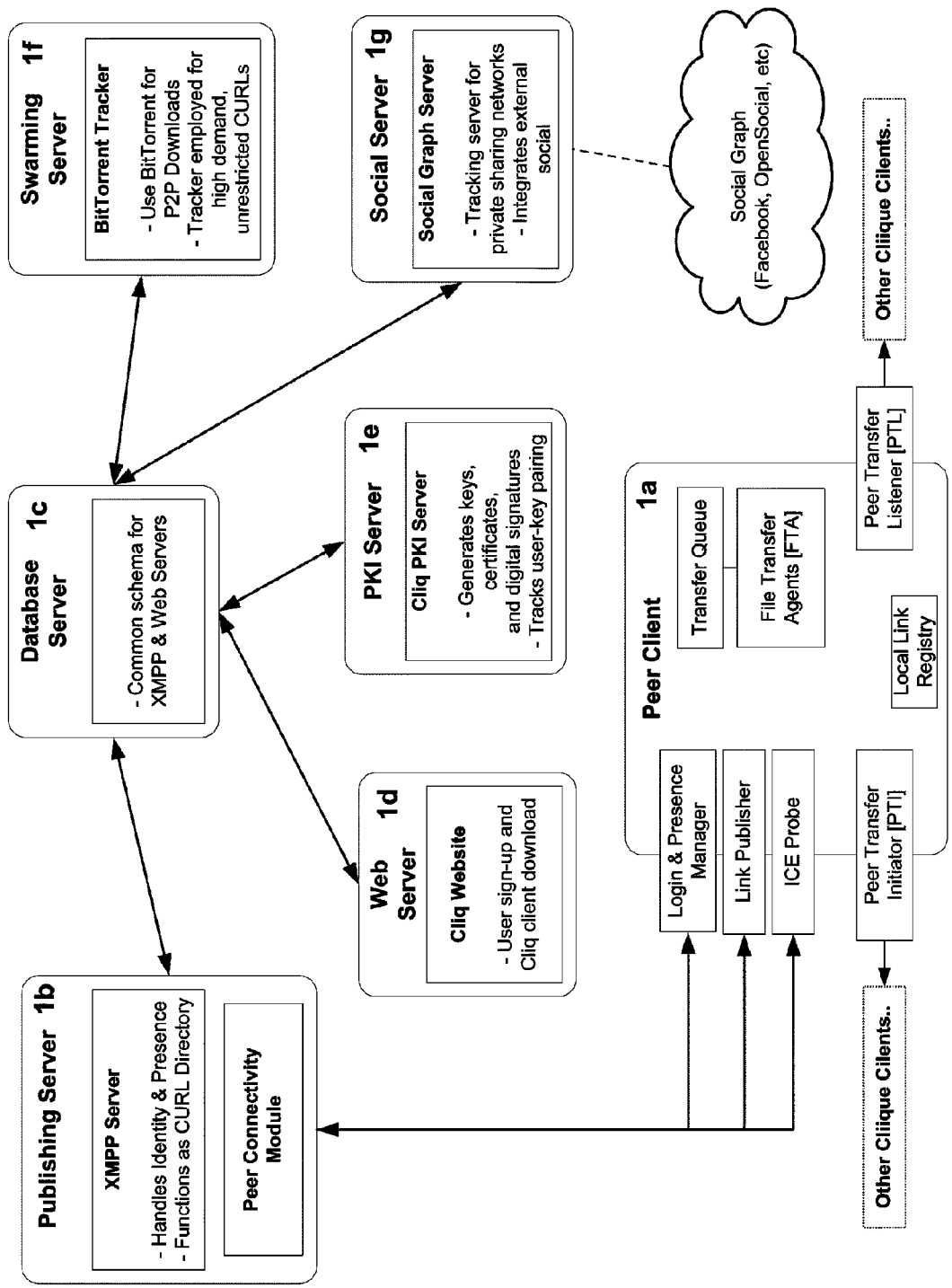
FIG. 1 is a high-level schematic diagram of one embodiment of the peering system invention.

The invention is a novel system and method for P2P file sharing and consists of means for a user to publish a URL or CURIE-style link ("edgelink") to a file on his or her peer computer. As part of the publishing process, the edgelink is registered with a central publishing server. Along with this link, additional connectivity information including file presence is stored on the central server to facilitate the process of connectivity establishment and NAT transversal between peers. Connectivity and NAT information are periodically republished by the publishing peer to ensure the information is current.

When a recipient clicks on the link, the registered publishing server is contacted, the server sends additional connectivity information to the peer, and automatically negotiates a path through any intermediary NATs, firewalls, routers, or similar devices without sending control signals to any of those intermediary devices (e.g. No UPnP messages delivered to any intermediary devices). This enables the recipient peer to connect directly to the publishing peer and transfer the file without relaying or proxying the file content or passing though any central servers.

This invention has a number of advantages which contribute to its novelty and inventiveness:

The URL or CURIE-style link may be cut and pasted into various formats such as text documents, html pages, IM messages, emails, and so on. This means that recipients may access the file from within different types of programs. In contrast, a BitTorrent torrent file may only be accessed by a suitable BitTorrent client. It may not be accessed by an application such as Microsoft Word.

The publishing mechanism follows an asynchronous messaging paradigm (also known as publish-subscribe model) where the process of publishing the link (the file itself is not published) involves registering it with a central server for consumption by an unrestricted and undefined set of subscribers. This is in contrast to FTP file sharing which supports a URL format (ftp://file/) but does not publish that link to a central server. This is also in contrast to an Instant Message which is published in real-time in a non URI format for consumption by a specific recipient.

By registering links with a server, the identity of the publishing peer may be recorded and authenticated. Similarly, to access the link, the identity of the recipient peer may also be recorded and authenticated. In this way, the recipient peer could specify that it only wishes to receive files from authenticated publishing peers and vice versa.

By associating the link to the file with connectivity and presence information, this makes it possible to automatically negotiate a path through intermediary NATs, Firewalls, or similar devices without any intermediary device control signaling. This is in contrast to an FTP URI (e.g. ftp://server/file), web-centric sharing solutions that mirror and/or relay data through central servers, or torrent link which contains no associated connectivity information and therefore requires either manual configuration of routes through intermediary devices (e.g. TCP port 6881 for BitTorrent) or UPnP control signaling to automatically create routes.

By using a URL or CURIE-style links, an entirely anonymous and private sharing network can be created. Unlike a traditional web URL, it is impossible to determine the type of content or location of the participant by inspecting the URL or CURIE link structure. The addition of cryptographic stream encryption and digital signatures ensure an anonymous, secure, and private sharing of files.

By addressing files in the form of web-based URL or CURIE-style links, this enables the creation of Media RSS feeds that are published from and point to media content stored on the edge of the network instead of a central server. This content can either be downloaded or streamed in real-time. For example, this means that it is possible to create and publish content streams directly from a home computer without any file uploading and without the subscriber needing any specific software. This is in contrast to BitTorrent which requires that the torrent subscriber have a valid BitTorrent client installed.

Embodiments of the Invention

The invention may include the following components:

Addition of Swarming Protocol

The addition of a BitTorrent-like protocol that enables file transfers to benefit from "swarming". This is useful if the sender sends the URL link to multiple recipients and they all try downloading from the sender at the same time. Note that this would be an enhanced version of existing swarming protocols as it would also support connectivity establishment and NAT transversal.

Addition of Link Syndication

The addition of a link syndication capability will the syndication of content through services and formats such as RSS, Media RSS, Start Page (e.g. iGoogle), and Web Pages.

This will allow other users to subscribe to content feeds and get notified of newly published CURLs. A user will also be able to subscribe to another user's CURL feed as a method of tracking newly shared content.

Addition of Indexing & Search
  The addition of text descriptions to CURLs and the indexing of those text descriptions on the publishing server.
  This will allow users to browse and search for published content via keywords.

Generation of Private, Obfuscated CURLs
  The generation of private and obfuscated CURLs by using a link character encoding scheme that cannot be deciphered.
  This allows users to share files without releasing any information about the file. This is useful when sharing sensitive files that could be compromised by following a standard URL format that includes a server name or IP address and file path.
  Under this scheme, a CURL would act solely as a unique link without any identifying information. All necessary identifying information (except the file itself) would be received when contacting the publishing server.
  An example format might look like: http://cliqshare.com/EA83BZ99.

Generation of Compact, Private, Obfuscated CURLs
  The addition of a compaction scheme for CURLs that deviates from standard URL like conventions in order to shorten the overall character length of the link.
  This allows users to share links more easily and accurately over all communication channels including email, IM, the web, phone, and social networks.
  An example format might look like: [curl:EA83BZ99]

Addition of a Policy Engine
  The addition of a policy engine that enables the publishing server to enforce policies around how CURLs are published and how CURLs are consumed.
  These policies can be used to limit downloads, enforce security, and restrict access.

Addition of a Buddy List
  The addition of a "buddy list" that allows a user to maintain a contact list of friends and to selectively send CURLs to a specific subset of those friends.
  This allows users to target content to specific individuals. In combination with a Policy Engine, this allows users to restrict the set of other users that have access to a published CURL.

Addition of a Public-key Cryptography Scheme
  The addition of a Public-key cryptography scheme to secure P2P file transfers and to uniquely identify users on the network through digital signatures.
  This will ensure that all information is kept private and secure at all points between publishing a CURL, subscribing to a CURL, and transferring files.
  The Public-key scheme would also ensure the identity of any peers in the network through the use of digital signatures. Any messages originating from peers would be digitally signed to ensure authenticity.
  This would also require the addition of a central certificate authority to issue and manage the sharing of encryption keys.

Integration of Social Network
  The addition of a social network layer on top of the URL-publishing method. New and updated links to content could be automatically published to all recipients on a distribution list. The user would choose who to include on the distribution list. In essence, this would enable the creation of a private P2P file sharing networks.
  The user would also be able to target files to individual users and groups that are part of the social network. Through a policy engine, the user could also restrict access to users, groups, and sub-networks within the social network.

Addition of Private P2P File Sharing Networks
  The addition of private file sharing networks where users invite other users to form groups for the purposes of automatic file sharing. The addition of auto-generation and publishing of CURLs for new content stored on a group member's computer.
  This enables a user to create a private file sharing network and invite friends into that network. New content and updated links to content could be automatically published to all members of the network.
  Following this scheme, content links (CURLs) could be indexed and searchable by members of the network who are looking for a specific content file.

Addition of Central Publishing
  The addition of central publishing where the content referenced by a CURL is temporarily or permanently cached to a central server.
  This would enable a user to publish a file that could be downloaded from a standard Web server by another user via HTTP in the event that the publishing user is not online.
  This can be viewed as a premium service for higher priority files that cannot suffer downtime if the publishing user unplugs his or her computer.

Addition of a Version Control System
  The addition of version control system that will keep a history of changes to a CURL published piece of content or file.
  This allows the user to publish successive, updated versions of a file. Version control would be facilitated via the publishing server and allow subscribers to select a version of the file to download.
  Combined with Central Publishing, Version Control would allow users to centrally store and share all versions with their complete version history.

Addition of Shared Workspaces
  The addition of a group where users invite other users for the purposes of collaborating and group editing published content. This addition of auto-generation and auto-publishing of newly added content into the workspace from a group member's computer.
  Shared Workspaces would allow users to create and join a workspace. New content, files, and updated links would be published into the Workspace automatically.
  This would enable users to automatically share files and collaborate in a rapid fashion. This would be combined with Central Publishing and Version Control to enable complete content history tracking and offline sharing.

Addition of Data Backup
  This addition of a private workspace with auto-generation and auto-publishing of newly added content into the private workspace from the user's computer. This addition of caching of published content on a central server keeping track of a history of all changes to published content.
  Private Workspace could also double as a means for users to backup and secure their data. By automatically publishing and caching selected files through Central Publishing with Version Control, a user could effectively backup and maintain a history of content changes. This would serve as a recovery mechanism in the case of a hard drive failure.

Addition of Media Publishing System

The addition of a billing and transaction system for the sale of content to other users. The integration of various media publishing systems such as iTunes or Facebook.

For media authors, the system could act as a media publishing system enabling a user to publish content from their computer to various publishing servers. These publishing servers could include servers internal to the system or external publishing servers like Facebook, iTunes, MySpace, Blogs, Web Pages, and Content Management Systems (CMS).

As an example, this would allow musicians to quickly publish and share their latest music tracks.

Creation of 3$^{rd}$-Party File Sharing Platform

The addition of an Application Programming Interfaces (APIs) and a Software Development. Kit (SDK) allowing 3$^{rd}$ parties to develop applications that can link, store, and connect directly to content stored on a user's computer using the CURL publishing scheme.

As a generalization, the system could be extended to include a Software Development Kit (SDK) and platform Application Programming Interface (API) allowing 3$^{rd}$-Party developers to create plug-ins and applications that support CURL publishing mechanisms.

This would enable 3$^{rd}$-Party developers to create applications that can link, store, and connect directly to computers on the edge of the network.

Addition of Content Streaming

The addition of real-time transport and media handling controls to support streaming content directly from a user's computer.

This would allow any user to quickly stream personal audio or video files from their computer to their friends or family.

Examples of Embodiments of the Invention

Example 1

P2P File Sharing Infrastructure

Referring to FIG. 1, there is illustrated a High-level Schematic of Peering System of one embodiment of the invention. It has six basic functioning modules: a Peer Client 1a, a Publishing Server 1b, a Database Server 1c, a Web Server 1d, a PKI Server 1e, and a Swarming Server 1f. Not shown are typical system components including system administrative functions, privacy protection functions, user setup and run execution functions, reporting services, input and output devices, and backup systems. Not specifically disclosed but would be obvious to one skilled in the art are provisions of interfaces and services. Also not shown or described are all references to the Database Server 1c as these would be obvious to anyone skilled in the art.

The Peer Client 1a runs continuously on a peer node. It authenticates and communicates its connectivity information periodically with the Publishing Server 1b. It negotiates direct connections to other peers for exchange files directly without relaying through a central server. Direct connection negotiation is mediated by the Publishing Server 1b using the STUN (Simple Transversal of UDP over NATs) UDP NAT transversal algorithm. As an alternative, one could use the TURN (Transversal Using Relay NAT) however that would relay all data through a central server, obviating the benefits of P2P and incurring significant network bandwidth cost. One could alternatively also use the TCP protocol however it is not technically feasible to mediate connectivity establishment and NAT transversal thereby preventing direct P2P file transfer.

When a peer publishes a new link to a file or group of files, the Peer Client 1a requests an edgelink in URL or CURIE syntax. The Publishing Server 1b generates the edgelink using a one-way irreversible hashing algorithm. The Peer Client accepts the edgelink and sends its security access permissions to the Publishing Server 1b. The security permissions denote who can request the content and for how long. Security permissions are stored with the edgelink in the Database Server 1c. The Publishing Server 1b communicates with the Web Server 1d to create a unique HTML (or equivalent, e.g. Flash) webpage preview of the file(s) called the "prepage". Optional text, audio, images, or video are embedded in the webpage depending on the security permissions of the edgelink.

The Peer Client 1a periodically updates Presence and Connectivity information with the Publishing Server 1b to facilitate direct connection mediation. Unlike standard web URLs today, it is impossible for a malicious user to use the published edgelink to determine the type of content or location of the peer sharing the content. Since presence and connectivity information is not mapped inside the edgelink, it is impossible to discover anything from the edgelink without contacting the Web Server 1d. Any requests to the Web Server 1d must pass the specified security permissions for the edgelink.

To prevent identity impersonation, each Peer Client 1a generates a public-private key pair unique to each user-device pair. The public key is transmitted to the PKI Server 1e. The private key is never transmitted to any server. The PKI Server 1e stores the public key for every user-device pair. When a Peer Client 1a is installed on a new device for an existing user, the user undergoes a challenge process to ensure legitimacy of the new user-device peer. The challenge process is not specifically described but would be obvious to a person skilled in the art. Devices in this case can be PCs, servers, laptops, phones, or any Internet capable device.

A new file transfer is initiated by opening an edgelink. The first step is to satisfy the specified security permissions tied to the edgelink. Security permissions may consist of one or more shared keys, shared secrets, email challenge-response authentication, or social graph identity verification (e.g. through Facebook Connect). The Publishing Server 1b then relays the public key of the initiating Peer Client 1a requesting access to the file to the publishing Peer Client 1a. The initiating Peer Client 1a relays a message digest and digital signature generated cryptographically using its private key to the publishing Peer Client 1a. The Publishing Server 1b then mediates a secured and direct connection through intermediary NAT devices following a NAT transversal algorithm (e.g. STUN or ICE). Once a direct connection is established, the initiating Peer Client 1a reconfirms its identity by transmitting a digital signature generated using its private key.

The Swarming Server 1f is used for edgelinks without security permissions that are publicly accessible for download. It implements a modified swarming protocol supporting NAT transversal (e.g. BitTorrent over UDP) to replicate and distribute large files to a large number of peers. The implementation can be used for Broadcatching or wide distribution. Protocol encryption (e.g. Message stream and protocol encryption or MSE/PE) is used to prevent a man-in-the-middle attack. Encryption keys are encrypted and exchanged using the PKI Server 1e public keys. The details of this implementation should be obvious to one with skills in the art.

Example 2

Private Sharing Network

Figure 2:
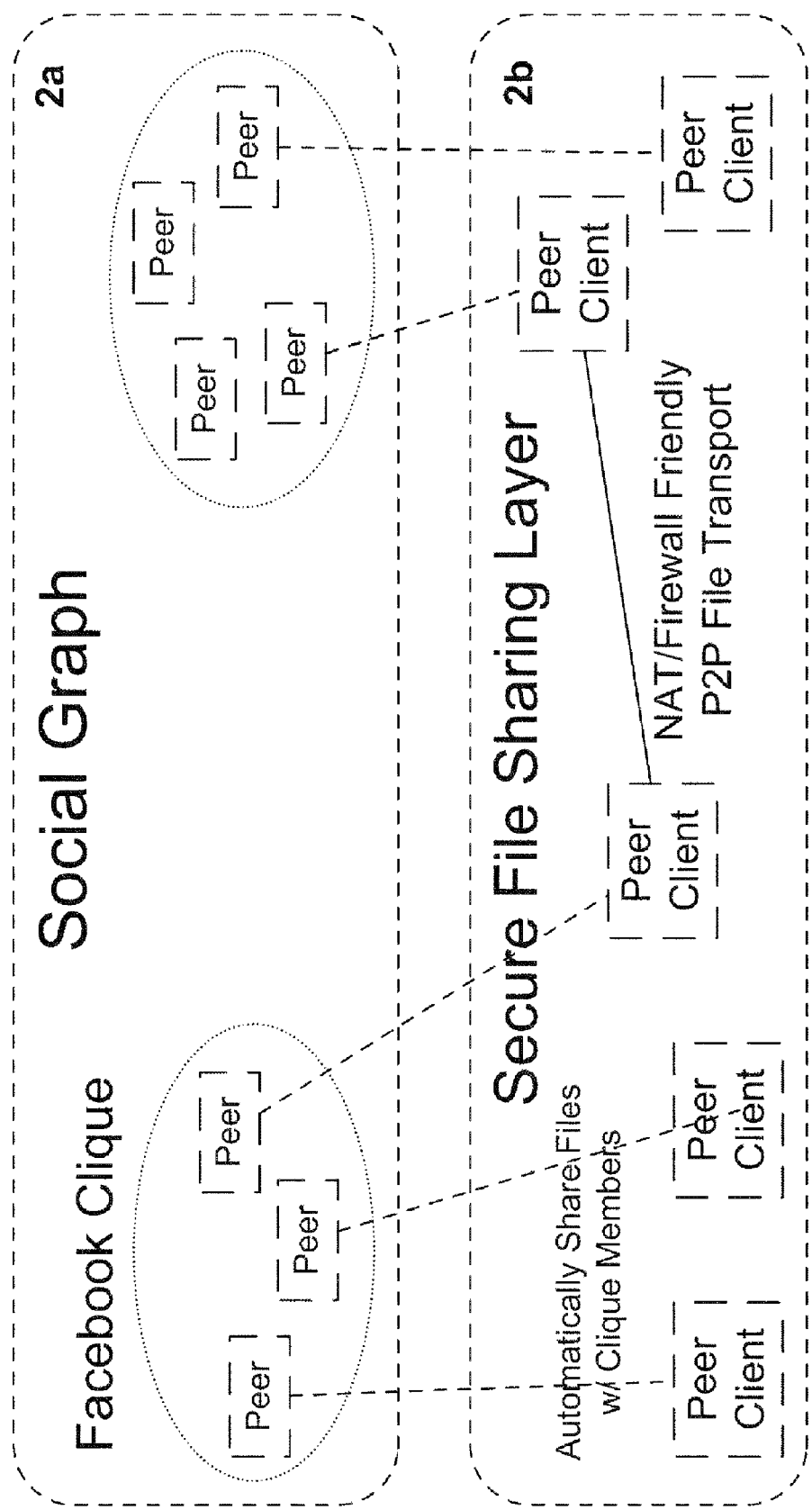
FIG. 2 is a schematic of a private sharing network using social graph of one embodiment of the invention.

FIG. 2 shows how a social graph can be layered on top of the P2P file sharing infrastructure described in Example 1 to enable a private sharing network (privnet). The social layer aggregates edgelinks published by peers who are members of the privnet creating a social taxonomy of shared content. Peers in the privnet can browse and search through this social taxonomy using a standard web user agent (web browser) to collaborate, interact, download, and discuss content contained within. In this model, the user experience is identical to searching, browsing, or collaborative with web-hosted content.

The Social Server 1g in FIG. 1 is used to import a social graph from a $3^{rd}$ party service (e.g. Facebook, MySpace, Google, etc). The Social Server 1g publishes an HTML interface enabling any authenticated peer to bind their social identity with their filesharing identity creating a "social peer". Any social peer can create their own privnet. Once a privnet is created, a social peer can invite any other directly linked connections in the social graph. Invited peers accept the invitation effectively binding them to the privnet. The Social Server 1g contacts the Publishing Server 1b to compile a database of all peer edgelinks in each privnet.

The Social Server 1g publishes an HTML interface (or equivalent, e.g. Flash, Silverlight) for each privnet accessible to any authenticated social peers. Using a standard user agent as a standalone browser or embedded within the Peer Client 1a, a social peer can browse, search, and interact with edgelinks. For example, a social peer can browse all edgelinks from another social peer, search for specific text contained within the edgelink prepage, interact with the edgelink prepage, and leave comments directly to the edgelink prepage. The Social Server 1g provides HTML interfaces via HTTP and stores any interactions in its database. The exact mechanisms for these web interactions should be obvious to one skilled in the art.

The social peer can request to download the file directly from prepage by clicking the edgelink. The download process then ensues as a P2P direct transfer as described in Example 1.

User Model 1—Publishing an Edgelink

The user selects a file, folder, or group of files on their computer for publishing as a URL or CURIE-style link. The user defines the access permissions for that file. E.g. the user specifies a password, the number of times the file can be downloaded, or the specific identities of the user(s) that can download the file. As part of the publishing process, a link is requested from the central publishing server. The publishing server generates a unique URL or CURIE for the file and sends it back to the user. The generated link has no relation to the file itself and so cannot be brute-forced hacked to figure out the name or type of file being shared. After receiving the link, the following information is sent and stored on the central server:
 a. Access permissions for the file selected by the user.
 b. A text description of the file if supplied by the user.
 c. Thumbnail or preview content for the file if it is an image, audio, or video file if selected by the user.
 d. A unique identifier for the publishing user.
 e. Personal details (name, photo, location) about the publishing user if selected by the user.
 f. Presence status for the user (e.g. online, offline).
 g. Connectivity information (e.g. IP address, port, foundation, transport protocol, priority, type, related address)

The user maintains a persistent connection with the publishing server and periodically updates presence information. The publisher server creates a unique web page publishing the edge link information included real-time updated presence.

User Model 2—Downloading a File through an Edgelink

The recipient receives an edge link via a web medium (e.g. email, search, social network, IM). Clicking the edge link opens up a web page with the information published by the user including presence status. The recipient requests the file(s) through the registered publishing server providing the necessary authentication credentials if required. The publishing server exchanges connectivity information for the user and recipient. It negotiates a direct connection between the user and recipient through any intermediary NATs, firewalls, routers, or similar devices following a connectivity establishment protocol (e.g. ICE, STUN, TURN). This enables the recipient peer to connect directly to the publishing peer and transfer the file without the file content passing through the server.

User Model 3—Private Sharing Networks Via Social Graph

A social graph can be added to Examples 1 and 2 to enable a user to browse or search for shared files in his social network. The user creates a group and selects the identities of members in his social network to invite. The publisher server creates a unique edge link for the group and associates the unique identity of each member to the group. The publishing server creates a web page for the group. Access permissions are optionally restricted to the identities of invited members. The user or an invited member selects a file, folder, or group of file(s) to publish into the group. The file(s) and/or folder(s) are published as in Example 1. For each file or folder, the publishing server adds a link to the group web page. The link is indexed and tagged appropriately enabling other members of the group to browse and search through the links. An invited member browses the group and clicks on a link provided by the user or another member of the group. The file(s) and/or folder(s) are downloaded as in Example 2. The invited member or user leaves a comment about the file and publishes his activity. The publisher server attaches the comment to the appropriate link and publishes the activity to the web page for the group.

Method of the Invention

A method is provided for creating a system for peer-to-peer file sharing comprising the following steps:
 a. ascribing a uniquely identified and anonymous link to an at least one file on a peer computer;
 b. registering said link with a publishing server that continuously and anonymously updates connectivity information about the peer;
 c. permitting a peer recipient access the link;
 d. receiving receive connectivity information about said peer from the server;
 e. receiving the file from the publishing peer without file content passing through the server; and,
 f. mediating any intermediary NAT devices without requiring any manual or automatic device reconfiguration.

A method for creating a private peer-to-peer file sharing network is provided comprising the following steps:
 a. integrating an external set of social graphs and building a plurality of private groups of individuals through an assembly or invitation process;
 b. aggregating uniquely identified and anonymous links to files stored on peer nodes within said plurality of private groups;

c. permitting a peer recipient access the link and receiving the file from a publishing peer without file content passing through the server; and, d. mediating any intermediary NAT devices without requiring any manual or automatic device reconfiguration.

The method for creating the peer-to-peer file sharing network may further comprise the steps of a. adding a social network layer;

b. adding a plurality of security options that require peers to authenticate prior to the release of identifying connectivity information.

c. adding a swarming protocol to allow wide-scale distribution of published content.

d. adding a link syndication capability for a peer to publish an automatically updated list of files that enables other users to subscribe to content feeds (streams) and get notified of changes and newly shared files;

e. indexing, searching through, browsing and commenting on published links;

f. adding a policy engine to control access to published links;

g. adding a buddy list for allowing a user to maintain a contact list of friends, co-workers, and other contacts and to selectively send link to all or a specific subset of those contacts;

h. adding a Public-key Cryptography Scheme for uniquely identifying peers and securing P2P transfers at all points between publishing a link, subscribing to a link, and transferring files;

i. adding means for publishing the content referenced by a link to a central server;

j. adding a version control system for keeping a history of changes to a published piece of content or file or set of files;

k. including means for keeping an automatically versioned backup copy of files stored on a remote server;

l. Adding a group where users invite other users for the purposes of collaborating and group editing published content published;

m. Adding means for version tracking and offline sharing;

n. Adding an automated backup system;

o. Adding a billing and transaction system for the sale of content to other users;

p. Adding means for integration of various central media publishing systems;

q. Adding a set of Application Programming Interfaces (APIs) and a Software Development Kit (SDK) for allowing 3rd parties to develop applications that can link, store, and connect directly to content stored on a peer computer;

r. Adding control means for real-time transport and media handling in order to support streaming content directly from a peer computer;

s. Adding means for mobile and embedded peers;

t. Adding means for the addition of a compaction scheme for links that deviates from standard URL, like conventions in order to shorten the overall character length of the link; and, u. Adding means for an obfuscation scheme to enhance content security and privacy.

The description above is not to be construed as limiting the scope of the invention but merely as providing illustrations and examples of some of the presently preferred embodiments of this invention. Thus the scope of the invention should be determined by the appended claims and their legal equivalents rather than by the examples given.

What is claimed is:

1. A system for peer-to-peer (P2P) file sharing comprising a publishing server having a computer processor, the publishing server operable to:
   (a) register a unique anonymous link generated for at least one selected file on a peer computer, the link providing anonymity for the peer computer by rendering the network address and identity of the peer computer as indecipherable by another peer notwithstanding possession of the link, and the link providing anonymity for at least one selected file by rendering the contents of the file as imperceptible to another peer notwithstanding possession of the link;
   (b) obtain periodic connectivity information for the peer computer; and
   (c) enable a peer recipient to access the link, the accessing initiating:
      (i) establishment of a network path between the peer recipient and the peer computer utilizing the connectivity information to enable the peer recipient to obtain the at least one selected file without the at least one selected file being required to pass through the publishing server; and
      (ii) mediation of intermediary network address translation (NAT) devices without requiring any manual or automatic NAT device reconfiguration.

2. The system of claim 1 further including a social network layer.

3. The system of claim 1 further comprising a plurality of security options that require peers to authenticate prior to the release of identifying connectivity information.

4. The system of claim 1 further comprising a swarming protocol to allow wide-scale distribution of published content and link syndication means for a peer to publish an automatically updated list of files that enables other users to subscribe to content feeds (streams) and get notified of changes and newly shared files.

5. The system of claim 1, further comprising means for indexing, searching through, browsing and commenting on published links.

6. The system of claim 1, further comprising a policy engine to control access to published links.

7. The system of claim 1, further comprising a buddy list for allowing a user to maintain a contact list of friends, co-workers, and other contacts and to selectively send link to all or a specific subset of those contacts.

8. The system of claim 1, further comprising a Public-key Cryptography Scheme for uniquely identifying peers and securing P2P transfers at all points between publishing a link, subscribing to a link, and transferring files.

9. The system of claim 1, including means for publishing the content referenced by a link to a central server.

10. The system of claim 1, further including a version control system for keeping a history of changes to a published piece of content or file or set of files.

11. The system of claim 1, further including means for keeping an automatically versioned backup copy of files stored on a remote server.

12. The system of claim 1, further comprising at least one of the following:
   (a) a group where users invite other users for the purposes of collaborating and group editing published content published;
   (b) means for version tracking and offline sharing;
   (c) an automated backup system;
   (d) a billing and transaction system for the sale of content to other users;

(e) means for integration of various central media publishing systems;
(f) a set of Application Programming Interfaces (APIs) and a Software Development Kit (SDK) for allowing 3rd parties to develop applications that can link, store, and connect directly to content stored on a peer computer;
(g) control means for real-time transport and media handling in order to support streaming content directly from a peer computer;
(h) means for mobile and embedded peers;
(i) means for the addition of a compaction scheme for links that deviates from standard URL like conventions in order to shorten the overall character length of the link; and
(j) means for an obfuscation scheme to enhance content security and privacy.

13. A system for a private peer-to-peer file sharing network comprising a publishing server having a computer processor, the publishing server operable to:
(a) integrate at least one social graph linking a plurality of users each associated with a peer node;
(b) build at least one private group comprising at least two of the plurality of users;
(c) aggregate unique anonymous links to selected files stored on the peer nodes within said private groups, the links providing anonymity for their respective peer nodes by rendering the network address and identity of each of the peer nodes as indecipherable by another peer node notwithstanding possession of the link, and the link providing anonymity for their respective selected files by rendering the contents of the files as imperceptible to another peer node notwithstanding possession of the links;
(d) enable one of the peer nodes of a selected private group to access one of the links of the selected private group to receive the respective file from the peer node storing the respective file without the respective file passing through the server; and
(e) mediate intermediary network address translation (NAT) devices without requiring any manual or automatic NAT device reconfiguration.

14. A method for peer-to-peer (P2P) file sharing:
(a) generating, by a computer processor, a unique anonymous link to at least one selected file on a peer computer, the link providing anonymity for the peer computer by rendering the network address and identity of the peer computer as indecipherable by another peer notwithstanding possession of the link, and the link providing anonymity for the at least one selected file by rendering the contents of the file as imperceptible to another peer notwithstanding possession of the link;
(b) registering the link with a publishing server that is operable to obtain periodic connectivity information for the peer computer;
(c) enabling a peer recipient to access the link;
(d) establishing a network path between the peer recipient and the peer computer utilizing the connectivity information;
(e) enabling the peer recipient to obtain the at least one selected file without the at least one selected file being required to pass through the publishing server; and
(f) mediating intermediary network address translation (NAT) devices without requiring any manual or automatic NAT device reconfiguration.

15. The method of claim 14 further comprising adding a social network layer.

16. The method of claim 14 further comprising adding a plurality of security options that require peers to authenticate prior to the release of identifying connectivity information.

17. The method of claim 14 further comprising adding a swarming protocol to allow wide-scale distribution of published content.

18. The method of claim 14, further comprising the addition of at least one of the following:
(a) adding a link syndication capability for a peer to publish an automatically updated list of files that enables other users to subscribe to content feeds (streams) and get notified of changes and newly shared files;
(b) indexing, searching through, browsing and commenting on published links;
(c) adding a policy engine to control access to published links;
(d) adding a buddy list for allowing a user to maintain a contact list of friends, co-workers, and other contacts and to selectively send link to all or a specific subset of those contacts;
(e) adding a Public-key Cryptography Scheme for uniquely identifying peers and securing P2P transfers at all points between publishing a link, subscribing to a link, and transferring files;
(f) adding means for publishing the content referenced by a link to a central server;
(g) adding a version control system for keeping a history of changes to a published piece of content or file or set of files;
(h) including means for keeping an automatically versioned backup copy of files stored on a remote server.

19. The method of claim 14, further comprising the addition of at least at least one of the following:
(a) adding a group where users invite other users for the purposes of collaborating and group editing published content published;
(b) adding means for version tracking and offline sharing;
(c) adding an automated backup system;
(d) adding a billing and transaction system for the sale of content to other users;
(e) adding means for integration of various central media publishing systems;
(f) adding a set of Application Programming Interfaces (APIs) and a Software Development Kit (SDK) for allowing 3rd parties to develop applications that can link, store, and connect directly to content stored on a peer computer;
(g) adding control means for real-time transport and media handling in order to support streaming content directly from a peer computer;
(h) adding means for mobile and embedded peers;
(i) adding means for the addition of a compaction scheme for links that deviates from standard URL like conventions in order to shorten the overall character length of the link; and
(j) adding means for an obfuscation scheme to enhance content security and privacy.

20. A method for a private peer-to-peer file sharing network comprising:
(a) integrating at least one social graph linking a plurality of users each associated with a peer node;
(b) building at least one private group comprising at least two of the plurality of users;
(c) aggregating, by a computer processor, unique anonymous links to selected files stored on the peer nodes within said private groups, the links providing anonymity for their respective peer nodes by rendering the network address and identity of each of the peer nodes as indecipherable by another peer node notwithstanding possession of the link, and the link providing anonymity for their respective selected files by rendering the contents of the files as imperceptible to another peer node notwithstanding possession of the links;

(d) enabling one of the peer nodes of a selected private group to access one of the links of the selected private group to receive the selected file from the peer node storing the respective file without the respective file passing through the server; and (e) mediating intermediary network address translation (NAT) devices without requiring any manual or automatic NAT device reconfiguration.

* * * * *